(12) United States Patent
Hillel et al.

(10) Patent No.: US 11,905,028 B2
(45) Date of Patent: Feb. 20, 2024

(54) AIRCRAFT COMPRISING HYDROGEN STORAGE TANKS

(71) Applicant: ROLLS-ROYCE plc, London (GB)

(72) Inventors: Malcolm L Hillel, Derby (GB); Alexis Lambourne, Belper (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/562,775

(22) Filed: Dec. 27, 2021

(65) Prior Publication Data
US 2022/0281615 A1 Sep. 8, 2022

(30) Foreign Application Priority Data

Jan. 19, 2021 (GB) ...................................... 2100664

(51) Int. Cl.
| | | |
|---|---|---|
| *B64D 37/30* | (2006.01) | |
| *B64D 37/04* | (2006.01) | |
| *B64D 37/06* | (2006.01) | |
| *B64C 1/22* | (2006.01) | |

(52) U.S. Cl.
CPC ................ *B64D 37/30* (2013.01); *B64C 1/22* (2013.01); *B64D 37/04* (2013.01); *B64D 37/06* (2013.01)

(58) Field of Classification Search
CPC ......... B64D 37/04; B64D 37/06; B64D 37/30
See application file for complete search history.

(56) References Cited

U.S. PATENT DOCUMENTS

| | | |
|---|---|---|
| 7,051,979 B2 | 5/2006 | Howe |
| 10,800,525 B2 | 10/2020 | Sankrithi et al. |

(Continued)

FOREIGN PATENT DOCUMENTS

| | | |
|---|---|---|
| CN | 107972877 A | 5/2018 |
| CN | 207712306 U | 8/2018 |

(Continued)

OTHER PUBLICATIONS

Hardiman, Jake. "A Look at the Airbus A330 MRTT: The Military Version of the A330-200." Simple Flying, Nov. 29, 2020, simpleflying.com/airbus-a330-mrtt (Year: 2020).*

(Continued)

*Primary Examiner* — Richard Green
*Assistant Examiner* — Ka Chun Leung
(74) *Attorney, Agent, or Firm* — Oliff PLC

(57) ABSTRACT

An aircraft comprises a hydrogen-fuelled propulsion system, a plurality of like generally cylindrical hydrogen storage tanks and a conveying system arranged to convey hydrogen from the hydrogen storage tanks to the hydrogen-fuelled propulsion system. The aircraft further comprises a fuselage having a cargo bay (502) including one or more (510A-G) of the plurality of hydrogen storage tanks, the longitudinal axes (511A-G) of the one or more hydrogen storage tanks within the cargo bay extending parallel to the longitudinal axis (501) of the fuselage and lying in one or more planes (595, 597) extending across the width dimension of the cargo bay. The hydrogen storage tanks within the cargo bay have a common aspect ratio R in the range $4.2 \leq R \leq 25.7$, allowing the volume of space with the cargo bay occupied by stored hydrogen to be maximised or approximately maximised.

2 Claims, 3 Drawing Sheets

(56) References Cited

U.S. PATENT DOCUMENTS

| | | | |
|---|---|---|---|
| 2004/0129836 A1* | 7/2004 | Seidel | B64D 27/02 244/120 |
| 2005/0178880 A1 | 8/2005 | Howe | |
| 2005/0230554 A1* | 10/2005 | Schoene | B64D 37/04 244/135 R |
| 2008/0230654 A1* | 9/2008 | Velicki | B64D 37/04 244/135 R |
| 2012/0135329 A1* | 5/2012 | Middelman | H01M 8/04201 141/11 |
| 2014/0117163 A1 | 5/2014 | Simpson | |
| 2014/0339367 A1 | 11/2014 | Sankrithi et al. | |
| 2015/0217869 A1* | 8/2015 | Brunaux | B64D 37/02 244/58 |
| 2015/0336680 A1 | 11/2015 | Schumacher et al. | |
| 2016/0033083 A1 | 2/2016 | Leachman et al. | |
| 2021/0339858 A1 | 11/2021 | Ermanoski | |
| 2022/0074548 A1 | 3/2022 | Clarke et al. | |
| 2022/0170597 A1* | 6/2022 | Saha | F17C 13/026 |

FOREIGN PATENT DOCUMENTS

| | | | |
|---|---|---|---|
| EP | 2 384 972 A2 | 11/2011 | |
| FR | 3096029 | * 11/2020 | B64D 37/04 |

OTHER PUBLICATIONS

"Airplane Characteristics for Airport Planning" Airbus, May 1, 2011. (Year: 2011).*

Dietl, T. et al., "Polaris Future Aircraft Design Concept, "Jul. 1, 2018, pp. 1-38, retrieved from https://www.dlr.de/content/en/downloads/2018/university-of-stuttgart-polaris-futue-aircraft-design-concept_3098.pdf?blob=publicationFile&v=10 on May 6, 2022, pp. 1-38.

Gardiner, G., Carbon fiber in pressure vessels for hydrogen, Composites World, Oct. 23, 2020, Retrieved from https://www.compositesworld.com/articles/cfrp-pressure-vessles-for-hydrogen on May 6, 2022, pp. 1-15.

May 19, 2022 extended Search Report issued in European Patent Application No. 21215798.6.

Jun. 9, 2021 Search Report issued in British Patent Application No. 2100664.8.

Brelje et al. "Aerostructural Wing Optimization for a Hydrogen Fuel Cell Aircraft." American Institute of Aeronautics and Astronautics, Inc. Jan. 4, 2021. (Year: 2021).

Nov. 24, 2023 Office Action Issued in U.S. Appl. No. 18/187,818.

Nov. 28, 2023 Office Action issued in U.S. Appl. No. 18/187,830.

* cited by examiner

AIRCRAFT COMPRISING HYDROGEN STORAGE TANKS

CROSS-REFERENCE TO RELATED APPLICATIONS

This application is based upon and claims the benefit of priority from British Patent Application No. 2100664.8, filed on Jan. 19, 2020, the entire contents of which are herein incorporated by reference.

BACKGROUND OF THE INVENTION

Technical Field

The present disclosure relates to aircraft comprising hydrogen storage tanks, particularly hydrogen storage tanks containing gaseous hydrogen or suitable for containing gaseous hydrogen.

Description of Related Art

Hydrogen in either gaseous or liquid form is of increasing interest as a fuel for a variety of transport applications, including aeronautical applications, due to an absence of $CO_2$ generation at the point of use. However, storage of gaseous hydrogen at high pressure presents a significant technical challenge and in particular requires a significant increase in the volume of stored fuel compared to that required for traditional fuel. Minimising the loss of useful space within an aircraft and maximising the amount of stored hydrogen are important considerations in relation to retro-fitting known aircraft with hydrogen storage tanks, or in designing new aircraft having conventional fuselage and wing forms.

BRIEF SUMMARY

According an example, an aircraft comprises a hydrogen-fuelled propulsion system, a plurality of like generally cylindrical hydrogen storage tanks, and a conveying system arranged to convey hydrogen from the hydrogen storage tanks to the hydrogen-fuelled propulsion system, the aircraft further comprising a fuselage having a cargo bay including one or more of the plurality of hydrogen storage tanks, the longitudinal axes of the one or more hydrogen storage tanks within the cargo bay extending parallel to the longitudinal axis of the fuselage and lying in one or more planes extending across the width dimension of the cargo bay, and wherein the hydrogen storage tanks within the cargo bay have a common aspect ratio R in the range $4.2 \leq R \leq 25.7$. Where the aircraft has the format of one of number of known aircraft, for example a format like that of the Airbus® A320®, the volume of the cargo bay which is occupied by the hydrogen storage tanks it contains is maximised or approximately maximised.

The cargo bay may include exactly two hydrogen storage tanks having a common aspect ratio R in the range $4.2 \leq R \leq 7.7$, each hydrogen storage tank being disposed on a respective lateral side of a vertical plane which passes through the central longitudinal axis of the fuselage and bisects the cargo bay. The hydrogen storage tanks may have a common diameter d in the range $1.0 \text{ m} \leq d \leq 1.1 \text{ m}$. The cargo bay may be either a forward or rear cargo bay of the aircraft.

The fuselage of the aircraft may have a forward cargo bay and rear cargo bay, each being bisected by a vertical plane passing through the central longitudinal axis of the fuselage, with the forward and rear cargo bays each including exactly one hydrogen storage tank, each hydrogen storage tank being located on a respective lateral side of the vertical plane and having an aspect ratio R in the range $4.2 \leq R \leq 7.7$. This allows the weight of the hydrogen storage tanks to be more evenly distributed along the length of the aircraft whilst keeping the centre of gravity of the tanks within or near the vertical plane passing through the central longitudinal axis of the fuselage. The hydrogen storage tanks may optionally also have a common diameter d in the range $1.0 \text{ m} \leq d \leq 1.1 \text{ m}$.

The cargo bay may include exactly seven like generally cylindrical hydrogen storage tanks arranged in a first set of three tanks and second set of four tanks, longitudinal axes of hydrogen storage tanks of the first and second sets lying in first and second planes respectively which extend across the width dimension of the cargo bay, the second plane being disposed vertically above the first plane, and the longitudinal axis of any given hydrogen storage tank of the first set having a position across the width of the cargo bay between the positions of the longitudinal axes of two adjacent hydrogen storage tanks of the second set. In this case, the hydrogen storage tanks may have a common aspect ratio R having a value in the range $7.5 \leq R \leq 15.4$, and optionally also a common diameter d in the range $0.5 \leq d \leq 0.63$. The seven tanks within the cargo bay are preferably distributed symmetrically about a vertical plane which passes through the central longitudinal axis of the fuselage and bisects the cargo bay so that their centre of gravity lies in or near that plane.

The cargo bay may include exactly thirteen like hydrogen storage tanks arranged in a first set of four tanks, a second set of five tanks and a third set of four tanks, the longitudinal axes of the hydrogen storage tanks of the first, second sets and third sets lying in first, second and third planes respectively which extend across the width dimension of the cargo bay, the second plane being disposed vertically above the first plane and the third plane being disposed vertically above the second plane, the longitudinal axis of any given hydrogen storage tank of the first and third sets having a position across the width of the cargo bay between the positions of the longitudinal axes of two adjacent tanks of the second set. In this case the hydrogen storage tanks may have a common aspect ratio having a value R in the range $10.4 \leq R \leq 25.7$ and optionally also a common diameter d in the range $0.3 \leq d \leq 0.44$. Preferably, the thirteen tanks within the cargo bay are distributed symmetrically about a vertical plane which passes through the central longitudinal axis of the fuselage and bisects the cargo bay, so the centre of gravity of the tanks lies in or near that plane.

The conveying system preferably comprises a manifold system providing for one or more of the hydrogen storage tanks within a cargo bay to be removed from the cargo bay such that the remaining hydrogen storage tanks within the cargo bay remain operatively coupled to the hydrogen-fuelled propulsion system. This provides an aircraft in which the hydrogen fuel capacity and payload may be optimised for a given flight mission or flight profile.

BRIEF DESCRIPTION OF THE DRAWINGS

Example aircraft are described below with reference to the accompanying drawings in which.

DETAILED DESCRIPTION

Figure 1:
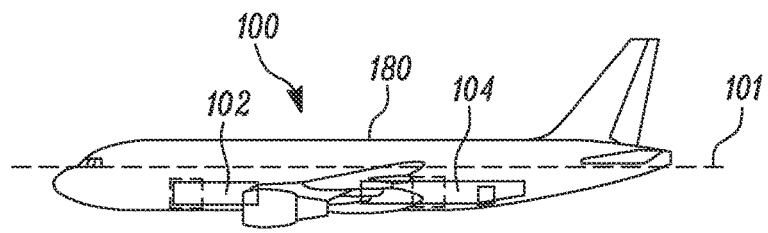
FIG. 1 is a side elevation of a first aircraft of a known type.
Figure 2:
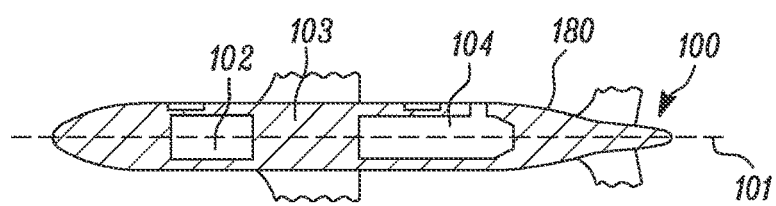
FIG. 2 is a longitudinal cross-section of the fuselage of the FIG. 1 aircraft.
Figure 4:
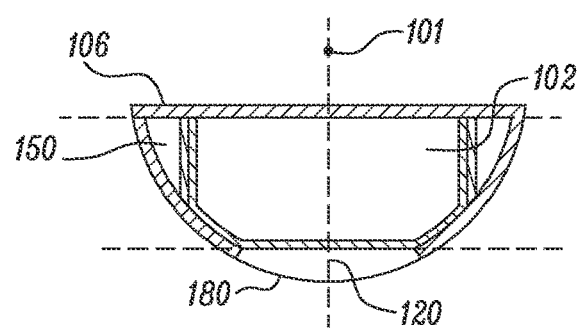
FIG. 4 is a transverse cross-section of a lower portion of the fuselage of the FIG. 1 aircraft.

Referring to FIGS. 1, 2 and 4, an aircraft 100 of known type (e.g. an Airbus® A320® or similar aircraft) comprises a fuselage 180 having central longitudinal axis 101. The fuselage 180 is divided longitudinally into a passenger space (not shown) and a cargo space 150 located vertically below the passenger space. The cargo space 150 includes a forward cargo bay 102 and a rear cargo bay 104 located respectively fore and aft of the wing centre structure 103 of the aircraft 100. A vertical plane 120 passing through the central longitudinal axis 101 of the fuselage 180 of the aircraft 100 divides each of the cargo spaces 102, 104 into like lateral halves, each being on a respective lateral side of the plane 120. The forward and rear cargo bays 102, 104 have lengths of three and four standard pallets respectively.

Figure 3:
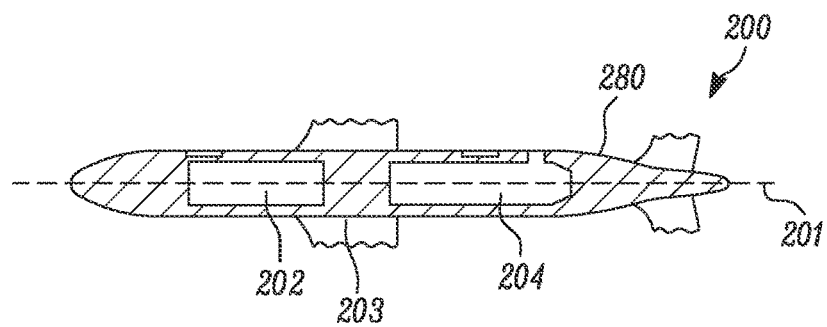
FIG. 3 is a longitudinal cross-section of the fuselage of a second aircraft of a known type.

FIG. 3 shows a horizontal longitudinal cross-section through the fuselage 280 of a second aircraft 200 of a known type (e.g. an Airbus® A321® or similar aircraft). The fuselage 280 has central longitudinal axis 201. The fuselage 280 is divided longitudinally into a passenger space and a cargo space located vertically below the passenger space. The cargo space has forward and rear cargo bays 202, 204 respectively fore and aft of the wing centre structure 203 of the aircraft 200. The forward and rear cargo bays 202, 204 have lengths of four and five pallets respectively.

Figure 5:
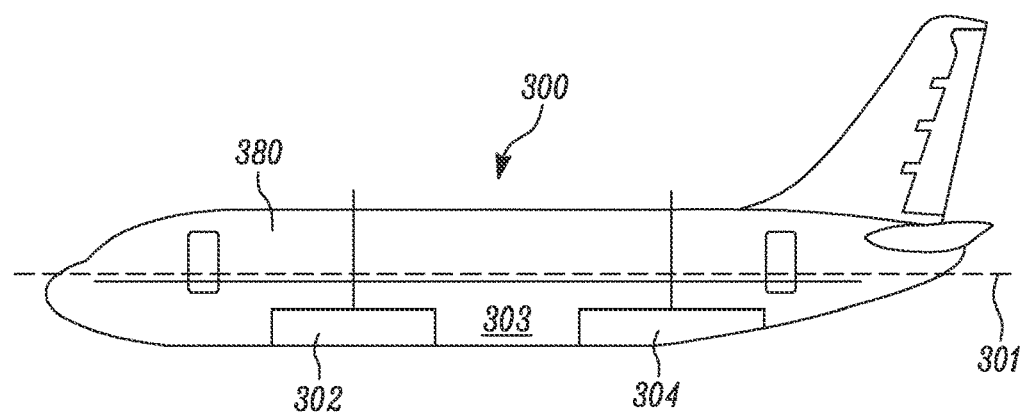
FIG. 5 is a side elevation of a third aircraft of a known type.

FIG. 5 shows a side elevation of a third aircraft 300 of a known type (e.g. a Boeing® 737® or similar aircraft) having a fuselage 380 with a central longitudinal axis 301, and forward and rear cargo bays 302, 304 located respectively fore and aft of a wing centre structure 303. Cargo bays of commercial aircraft such as 100, 200, 300 are typically in the region of 4.6 m to 7.7 m in length.

Figure 6:
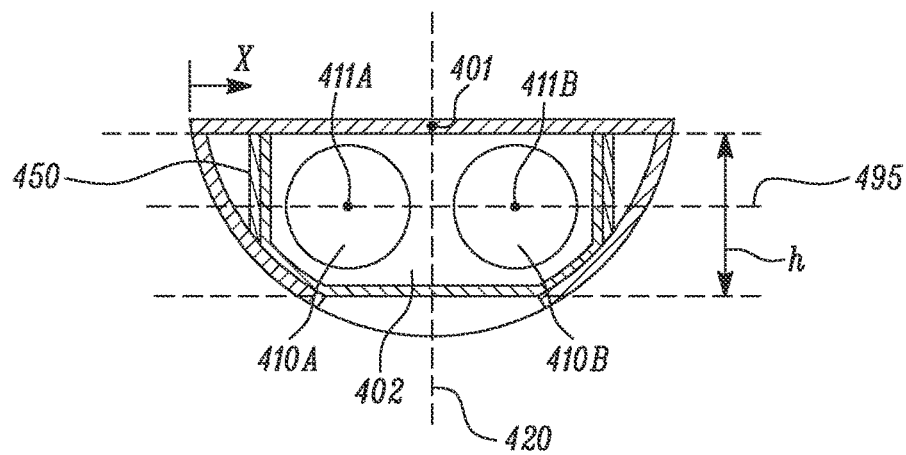
FIG. 6 is a transverse cross-section of a lower portion of the fuselage of a first example aircraft.
Figures 7A, 7B, 7C, 7D:
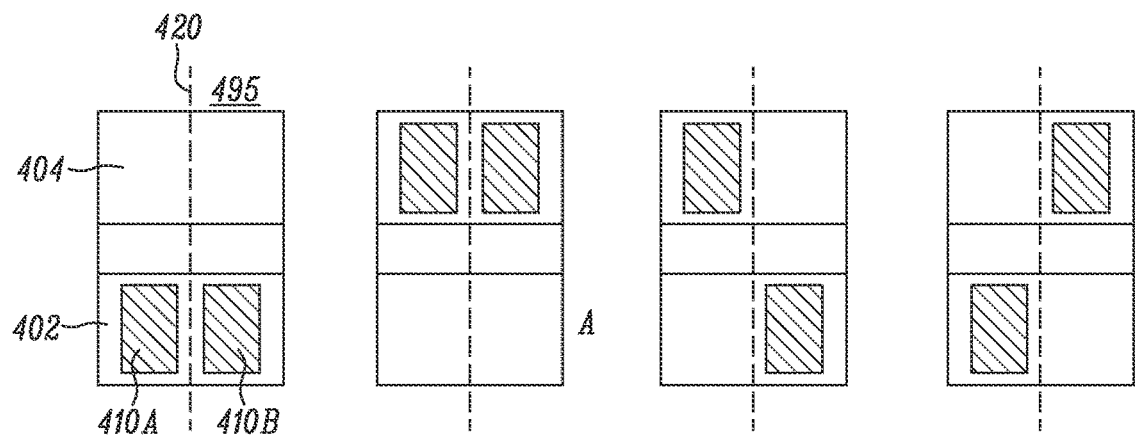
FIGS. 7A-D show alternative distributions of a pair of hydrogen storage tanks within the first example aircraft.

FIG. 6 shows a transverse cross-section through a lower portion of the fuselage of a first example aircraft, the portion defining a cargo space 450. The aircraft has a format similar to any of the aircraft 100, 200, 300 of FIGS. 1, 3 and 5 respectively. The cross-section includes a forward cargo bay 402 containing two like, generally cylindrical hydrogen storage tanks 410A, 410B. The tanks 410A, 410B are cylindrical with domed (e.g. hemispherical) ends. A vertical plane 420 through the longitudinal axis 401 of the fuselage of the aircraft divides the forward cargo bay into two like lateral portions, each hydrogen storage tank 410A, 41B being located in a respective lateral portion. The longitudinal axes 411A, 411B of the hydrogen storage tanks 410A, 410B are generally parallel to the central longitudinal axis 401 of the fuselage of the aircraft and lie in a plane 495 which is orthogonal to the plane 420 and which extends across the with dimension (x) of the cargo bay 402. The hydrogen storage tanks 410A, 410B are substantially identical, each having a diameter of 1.0 m or 1.1 m, or a diameter substantially equal to the height h of the cargo bay 402. The aspect ratio R (i.e. length/diameter) of the hydrogen storage tanks 410A, 410B may be in the range 4.2≤R≤7.7 so that the length of the tanks may be equal to the length of the cargo bay 402. FIG. 7A shows a horizontal longitudinal cross-section through the cargo bay 402 in the plane 495. The aircraft has a rear cargo bay 404 available for payloads such as baggage and freight.

The aircraft comprises a hydrogen-fuelled propulsion system (for example one or more PEM fuel cells, one or more hydrogen-fuelled gas turbine engines or a combination of one or more fuel-cells and one or more gas turbine engines) and a conveying system arranged to convey hydrogen from the hydrogen storage tanks to the propulsion system.

The mass of hydrogen storage tanks is much greater than the mass of fuel they may contain, therefore such tanks need to be carefully located within an aircraft in order to ensure that the centre of gravity of the aircraft is not in an unsuitable position. Gaseous hydrogen fuel accounts for only 20% of the total mass of a full hydrogen storage tank. FIGS. 7B-7D show alternative locations for the hydrogen fuel tanks in variants of the first example aircraft. Both tanks may be located in the rear cargo bay (FIG. 7B), or alternatively one tank may be in the forward cargo bay and one in the rear cargo bay (FIGS. 7C and 7D), although in all cases each tank is located on a respective lateral side of the plane 420.

Figure 8:
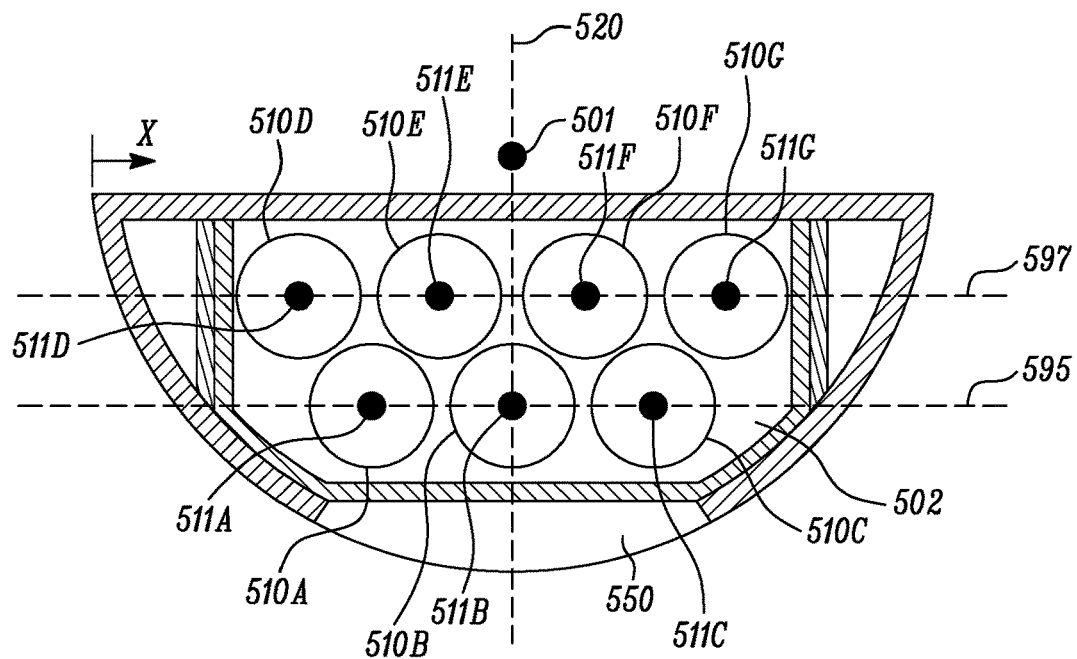
FIG. 8 is a transverse cross-section of a lower portion of the fuselage of a second example aircraft.

FIG. 8 shows a transverse cross-section through a lower portion of the fuselage of a second example aircraft, the portion defining a cargo space 550 which includes a forward cargo bay 502. The aircraft has a general format similar to that of any of the aircraft 100, 200, 300 of FIGS. 1, 3 and 5. The forward cargo bay 502 contains seven hydrogen storage tanks 510A-G, the longitudinal axes 511A-G of the tanks being substantially parallel to the central longitudinal axis 501 of the fuselage of the aircraft. A first set of three tanks 510A-C is arranged such the tanks' longitudinal axes 511A-C lie in a first plane 595 extending across the width dimension (x) of the forward cargo bay 502. A second set of four tanks 510D-G is arranged such that the tanks' longitudinal axes 511D-G lie in a second plane 597 extending across the width of the forward cargo bay 502, the second plane 597 being disposed vertically above the first plane 595. Any given tank of the first set has a longitudinal axis which has a position x across the width of the cargo bay 502 which is in between the positions of the longitudinal axes of two adjacent tanks in the second set. For example, tank 510A has a longitudinal axis 511A located in the x direction between the positions of longitudinal axes 511D, 511E of tanks 510D, 510E respectively. The seven tanks 510A-G within the forward cargo bay 502 have a common aspect ratio R in the range 7.5≤R≤15.4 and a common diameter d in the range 0.5≤d≤0.63. The length of the tanks may be equal to the length of the cargo bay 502. In an alternative example aircraft of the invention, the seven hydrogen storage tanks 510A-G may be located in a rear cargo bay of the aircraft. The hydrogen storage tanks 510A-G within the cargo bay 502 are distributed symmetrically about a vertical plane 520 passing through the central longitudinal axis 501 of the aircraft, so that their centre of gravity lies in or near the plane 520.

Further hydrogen storage tanks may be located elsewhere in or on the aircraft, the centre of gravity of any such tanks lying in the plane 520. The aircraft comprises a hydrogen-fuelled propulsion system and a conveying system arranged to convey hydrogen from the hydrogen storage tanks to the propulsion system.

If the hydrogen storage tanks with the cargo bay 502 are touching, with tanks of the second set (plane 597) spanning the maximum width of the cargo bay, and the first and second set of tanks in contact with the bottom and top of the cargo bay 502 respectively, then the maximum width of the cargo bay 502 is 8r and the height of the cargo bay 502 is 3.732r, where r is the outer radius of the hydrogen storage tanks.

Figure 9:
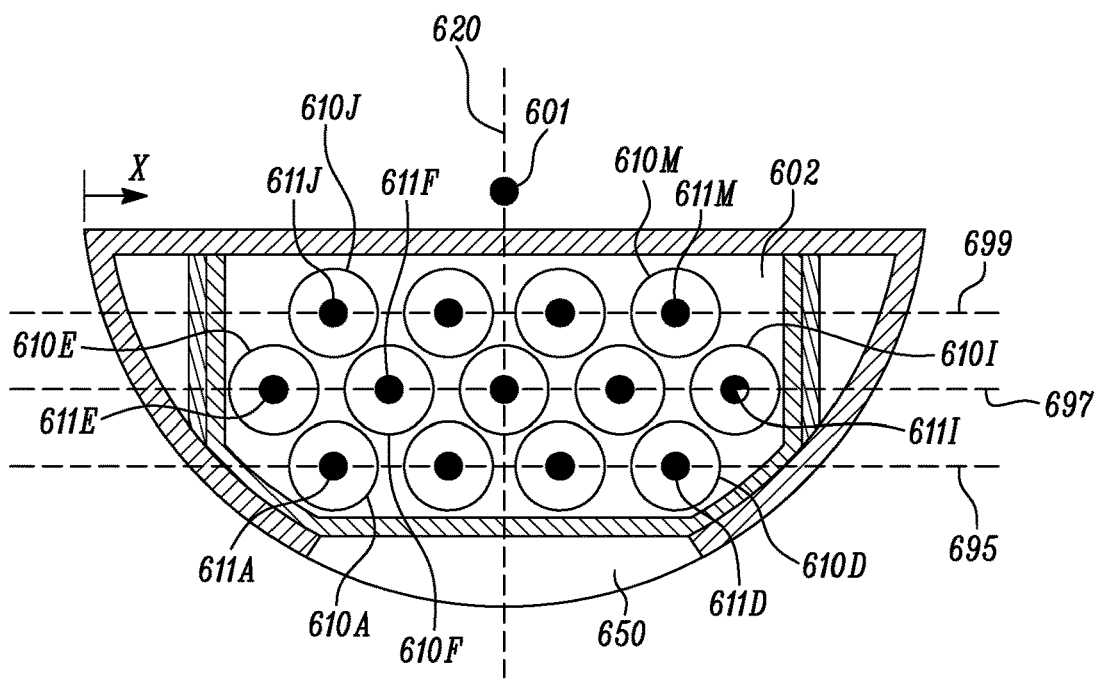
FIG. 9 is a transverse cross-section of a lower portion of the fuselage of a third example aircraft.

FIG. 9 shows a transverse cross-section through a lower portion of the fuselage of a third example, the portion defining a cargo space 650 which includes a forward cargo bay 602. The aircraft has a general format similar to that of any of the aircraft 100, 200, 300 of FIGS. 1, 3 and 5. The forward cargo bay 602 contains thirteen hydrogen storage tanks 610A-M, the longitudinal axes 611A-M of the tanks being substantially parallel to the central longitudinal axis 601 of the fuselage of the aircraft. A first set of four tanks 610A-D is arranged such that the tanks' longitudinal axes 611A-D lie in a plane 695 extending across the width dimension (x) of the forward cargo bay 602. The longitudinal axes 611E-1 of each of a second set of five tanks 610E-1 lie in a plane 697 which extends across the width dimension of the cargo bay 602, the plane 697 being parallel to and vertically above the plane 695. A third set of four tanks 610J-M is arranged such the longitudinal axes 611J-M of the tanks lie in a third plane 699 extending across the width dimension of the cargo bay 602, the plane 699 being parallel to the planes 695, 697 and vertically above the plane 697. Any given tank of the first or third sets of tanks has a longitudinal axis which has a position across the width dimension (x) of the cargo bay 602 which is in between the positions of the longitudinal axes of a pair of adjacent tanks in the second set. For example, tanks 610A, 610J have respective longitudinal axes 611A, 611J located between the positions of the longitudinal axes 611E, 611F of tanks 610E, 610F of the second set of tanks. In an alternative example aircraft of the invention, the thirteen hydrogen storage tanks may be located in a rear cargo bay of the aircraft. The hydrogen storage tanks within the cargo bay 602 are distributed symmetrically about a vertical plane 620 passing through the central longitudinal axis 601 of the aircraft so that the centre of gravity of the tanks lies in or near the plane 620. The tanks 610A-M may have an aspect ratio R in the range 10.4≤R≤25.7. The diameter d of the tanks 610A-M may be in the range 0.3≤d≤0.44.

If the hydrogen storage tanks are touching, with tanks of the second set (plane 697) spanning the maximum width of the cargo bay, and the first and third sets of tanks in contact with the bottom and top of the cargo bay 602 respectively, then the maximum width of the cargo bay 502 is 10r and the height of the cargo bay 502 is 5.464r, where r is radius of the hydrogen storage tanks.

Tanks of the FIG. 6 arrangement have a larger diameter than those of the FIG. 8 arrangement, and tanks of the FIG. 8 arrangement have a larger diameter than those of the FIG. 9 arrangement for a given size of cargo bay. As tank diameter decreases, hoop stress also decreases and therefore the wall thickness of the tanks may be reduced. Tank packing fraction (i.e. the fraction of cargo bay volume occupied by hydrogen storage tanks) increases moving from the FIG. 6 arrangement to the FIG. 8 arrangement, and from the FIG. 8 arrangement to the FIG. 9 arrangement due to decreasing tank diameter. The volume of a cargo bay occupied by stored hydrogen may be increased further by taking advantage of the possibility of reduced tank wall thickness as tank diameter is reduced. However, as tank wall thickness reduces at constant tank length, overall tank stiffness decreases. A long, thin composite tank of relatively small wall thickness may therefore need to be supported to prevent tank flexing and resulting damage to the brittle matrix of the composite material of the tank.

As the number of hydrogen storage tanks within a cargo bay increases, interconnection and manifolding of the tanks become more complex, adding weight to an aircraft of the invention. There may therefore be trade-off between the number of hydrogen storage tanks within a cargo bay and the overall weight of an aircraft of the invention.

A further alternative embodiment of the invention employs an arrangement similar to that of FIG. 8 but with the tanks distributed differently between forward and rear cargo bays. For example, the rear cargo bay may accommodate four tanks and the forward cargo bay accommodate three tanks. However, the distribution of the hydrogen tanks preferably remains symmetric with respect to the plane 520.

The arrangements of hydrogen storage tanks shown in FIGS. 8 and 9 may each include an in-situ or common manifold arrangement allowing the number of tanks to be varied simply by removing some of the hydrogen storage tanks, with the rest of the tanks remaining operatively coupled to the hydrogen-fuelled propulsion system of the aircraft. This allows for the respective volumes of a cargo bay occupied by fuel and luggage or freight to be adjusted or traded-off in order to meet the requirements of a particular flight mission or flight profile. An in-situ manifold arrangement allows tanks to be inserted or removed without making further adjustments to the fuel system of an aircraft and allows an optimum balance between range and payload to be achieved for a given flight mission.

What is claimed is:

1. An aircraft comprising:
a hydrogen-fuelled propulsion system;
a plurality of like hydrogen storage tanks, each of which is generally-cylindrical in shape;
a conveying system arranged to convey hydrogen from the plurality of like hydrogen storage tanks to the hydrogen-fuelled propulsion system; and
a fuselage having a forward cargo bay and a rear cargo bay collectively containing exactly two of the plurality of like hydrogen storage tanks, wherein:
longitudinal axes of the two hydrogen storage tanks are (i) spaced from each other in a width direction of the forward and rear cargo bays, (ii) extend parallel to a central longitudinal axis of the fuselage, and (iii) define a plane extending across a width dimension of the forward and rear cargo bays;
the two hydrogen storage tanks each have a common aspect ratio R in a range of 4.2≤R≤7.7;
the two hydrogen storage tanks are each disposed on a respective lateral side of a vertical plane which includes the central longitudinal axis of the fuselage and longitudinally bisects each of the forward and rear cargo bays;
the two hydrogen storage tanks each have a common diameter d in a range of 1.0 m≤d≤1.1 m; and
the forward and rear cargo bays each include exactly one of the two hydrogen storage tanks.

2. The aircraft according to claim 1, wherein the conveying system comprises a manifold system providing for one of the two hydrogen storage tanks to be removed from one of the forward and rear cargo bays such that the remaining hydrogen storage tank remains operatively coupled to the hydrogen-fuelled propulsion system.

* * * * *